(12) United States Patent
Thomas

(10) Patent No.: US 9,980,864 B2
(45) Date of Patent: May 29, 2018

(54) CALF BUMPER SYSTEM

(71) Applicant: Erik Trevor Thomas, Port Charlotte, FL (US)

(72) Inventor: Erik Trevor Thomas, Port Charlotte, FL (US)

( * ) Notice: Subject to any disclaimer, the term of this patent is extended or adjusted under 35 U.S.C. 154(b) by 58 days.

(21) Appl. No.: 15/151,447

(22) Filed: May 10, 2016

(65) Prior Publication Data

US 2016/0331608 A1 Nov. 17, 2016

Related U.S. Application Data

(60) Provisional application No. 62/159,984, filed on May 12, 2015.

(51) Int. Cl.
*A61G 5/10* (2006.01)
*B62J 23/00* (2006.01)
*A61G 5/12* (2006.01)

(52) U.S. Cl.
CPC ............. *A61G 5/10* (2013.01); *A61G 5/1054* (2016.11); *A61G 5/128* (2016.11); *B62J 23/00* (2013.01); *A61G 2203/723* (2013.01)

(58) Field of Classification Search
CPC ........ A61G 5/10; A61G 5/128; A61G 5/1043; B62J 23/00
See application file for complete search history.

(56) References Cited

U.S. PATENT DOCUMENTS

| | | | | |
|---|---|---|---|---|
| 4,593,929 A | * | 6/1986 | Williams | A61G 5/00 16/DIG. 24 |
| 6,938,912 B1 | * | 9/2005 | Norton | B60D 1/06 280/507 |
| 8,882,129 B2 | * | 11/2014 | Nault | A61G 5/12 280/304.1 |
| 9,132,050 B1 | * | 9/2015 | Hector, Jr. | A61G 5/1043 |
| 2007/0057561 A1 | * | 3/2007 | Liao | A61G 5/12 297/423.19 |
| 2010/0025965 A1 | * | 2/2010 | Caldwell | B60D 1/60 280/507 |

* cited by examiner

*Primary Examiner* — Joseph M Rocca
*Assistant Examiner* — Michael R Stabley
(74) *Attorney, Agent, or Firm* — Sandra L Layer

(57) ABSTRACT

A calf bumper that covers an exposed metal bracket used to hold a leg rest on a wheelchair. The protective device is made of a flexible elastomeric material and is separable on one side with a cavity for the leg rest bracket plate and a central hole to encompass the leg post and the bracket pin. When deployed the bumper provides protective buffer surrounding the exposed bracket reducing the risk of injuries such as scrapes and skin tears caused by exposed wheelchair leg rest brackets.

7 Claims, 2 Drawing Sheets ns is known in the prior art. More specifically, pro-
CALF BUMPER SYSTEM

RELATED APPLICATION

The present patent application claims priority to the corresponding provisional patent application Ser. No. 62/159,984, entitled "CALF BUMPER SYSTEM" filed on May 12, 2015.

BACKGROUND OF THE INVENTION

Field of the Invention

The present invention relates to a Calf Bumper System and more particularly pertains to reducing the risk of scrapes and skin tears caused by wheelchair leg rest brackets.

Description of the Prior Art

The use of protective covers for wheelchair leg rest brackets is known in the prior art. More specifically, protective covers for wheelchair leg rest brackets previously devised and utilized for the purpose of reducing the risk of scrapes and skin tears caused by exposed wheel chair leg rest brackets are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a Calf Bumper System readily deployable for reducing the risk of scrapes and skin tears caused by wheelchair leg rest brackets, such ready deployment and reducing of risk being done in a safe, convenient, and economical manner.

In this respect, the Calf Bumper System according to the present invention substantially departs from the conventional concepts and designs of the prior art, and in doing so provides an apparatus primarily developed for the purpose of reducing the risk of scrapes and skin tears caused by wheelchair leg rest brackets.

Therefore, it can be appreciated that there exists a continuing need for a new and improved Calf Bumper System which can be used for reducing the risk of scrapes and skin tears caused by wheelchair leg rest brackets. In this regard, the present invention substantially fulfills this need.

SUMMARY OF THE INVENTION

In view of the foregoing disadvantages inherent in the known types of systems used to reduce the risk of scrapes and skin tears caused by wheelchair leg rest brackets now present in the prior art, the present invention provides an improved Calf Bumper System. As such, the general purpose of the present invention, which will be described subsequently in greater detail, is to provide a new and improved Calf Bumper System and method which has all the advantages of the prior art and none of the disadvantages.

To attain this, for a broad perspective, the present invention essentially comprises a calf bumper system readily deployable for reducing the risk of scrapes and skin tears caused by wheelchair leg rest brackets, such ready deployment and reduction of risk being done in a safe, convenient, and economical manner, such calf bumper system comprising a unitary device having a geometric configuration with an upper surface and a lower surface separated by a height, forward and rearward sides separated by a width, and first and second semi-circular ends. The unitary device has a unitary aperture extending from the upper surface to the lower surface and an interior chamber. The unitary device is fabricated of an elastomer.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved Calf Bumper System which has all of the advantages of the prior art systems used to reduce the risk of scrapes and skin tears caused by wheelchair leg rest brackets and none of the disadvantages.

It is another object of the present invention to provide a new and improved Calf Bumper System which may be easily and efficiently manufactured and marketed.

It is a further object of the present invention to provide a new and improved Calf Bumper System which is of durable and reliable constructions.

An even further object of the present invention is to provide a new and improved Calf Bumper System which is susceptible of a low cost of manufacture with regard to both materials and labor, and which accordingly is then susceptible of low prices of sale to the consuming public, thereby making such Calf Bumper System economically available to the buying public.

It is still another object of the current invention to provide a system that is reusable and may be quickly and easily removed and re-attached.

It is a still further object of the present invention to provide a system that may be easily cleaned and sanitized.

Lastly, it is an object of the present invention to provide a Calf Bumper System for reducing the risk of scrapes and skin tears caused by wheelchair leg rest brackets.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The same reference numerals refer to the same parts throughout the various Figures.

DESCRIPTION OF THE PREFERRED EMBODIMENT

Figure 1:
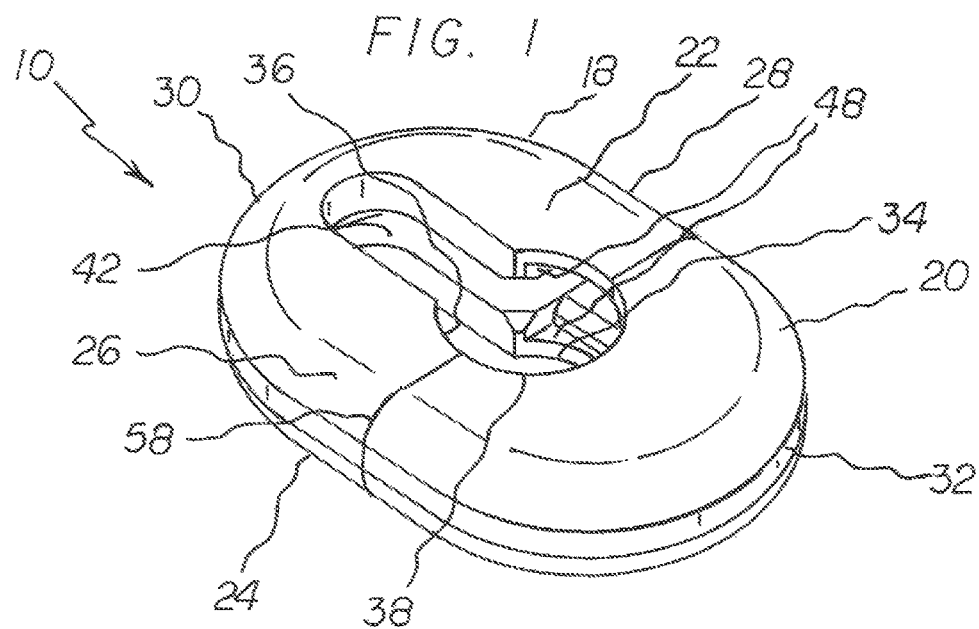
FIG. 1 is perspective view of a calf bumper system constructed in accordance with the principals of the current invention.
Figure 2:
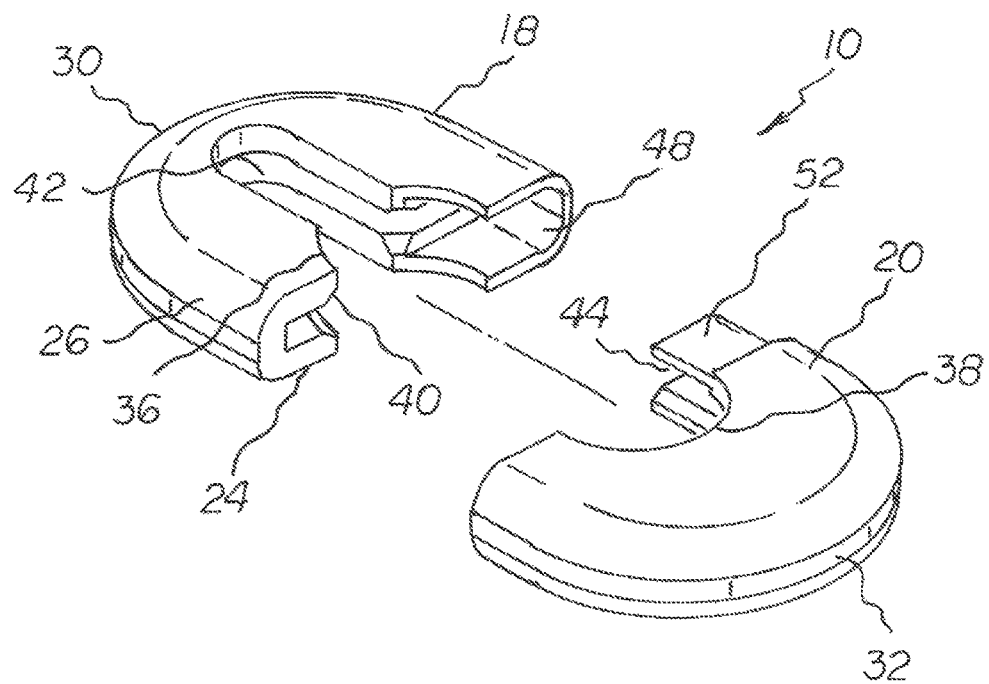
FIG. 2 is an exploded view of a calf bumper system constructed in accordance with the principals of the current invention.

With reference now to the drawings, and in particular to FIG. 1 through 4 thereof, the preferred embodiment of the new and improved Calf Bumper System embodying the principles and concepts of the present invention and generally designated by the reference numeral 10 will be described.

The present invention, the Calf Bumper System 10 is comprised of a plurality of components. Such components in their broadest context include a first section and a second section coupled together to form a unitary device having a central aperture. In this broad context, first provided is a calf bumper system readily deployable for reducing the risk of scrapes and skin tears caused by wheelchair leg rest brackets, such ready deployment and reduction of risk being done in a safe, convenient, and economical manner, such calf bumper system comprising a unitary device fabricated with a first section and a second section and having a geometric configuration with an upper surface and a lower surface separated by a height, forward and rearward sides separated by a width, and first and second semi-circular ends. The unitary device has a unitary aperture extending from the upper surface to the lower surface. The unitary device has a first chamber in the first section and a second chamber in the second section. The first and second chambers connect to form a unitary chamber. An opening on one side facilitates installation and removal of the device. The unitary device is fabricated of an elastomer.

Such components are individually configured and correlated with respect to each other so as to attain the desired objective.

Figure 3:
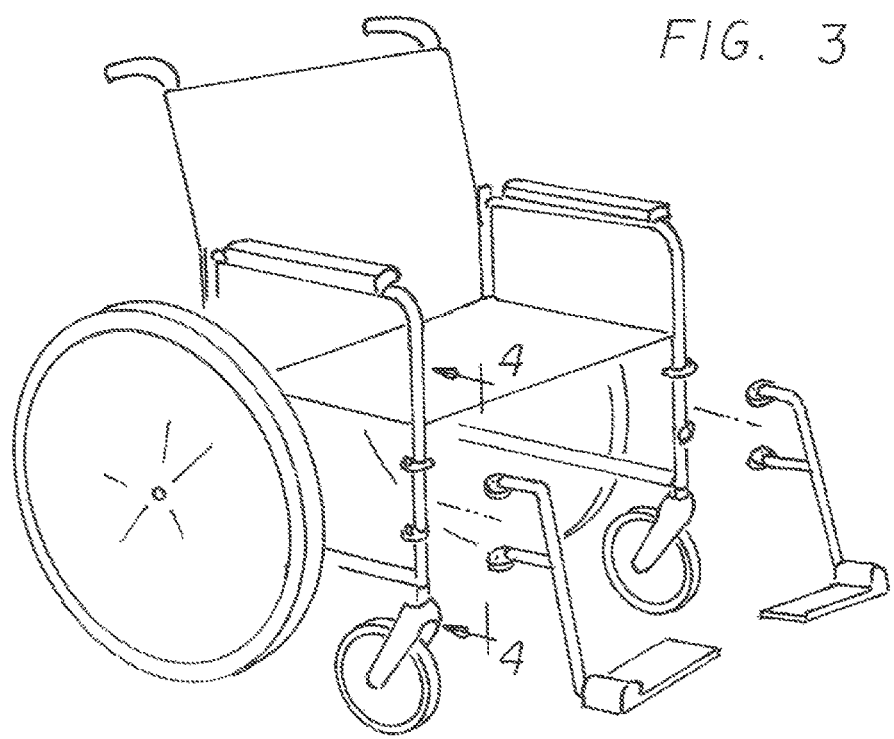
FIG. 3 is a perspective view of a wheel chair having leg rest brackets configured for use with the calf bumper system.
Figure 4:
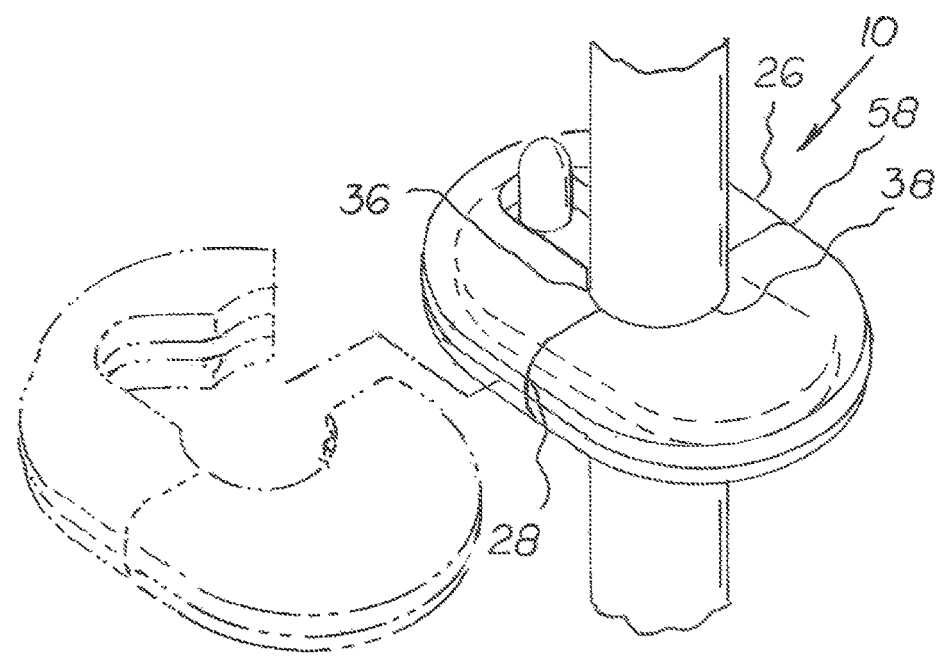
FIG. 4 is a perspective view of the system installed on a wheel chair leg rest bracket taken along line 4-4 of FIG. 3.

From a specific perspective, the invention of the present application is a calf bumper system 10 readily deployable for reducing the risk of scrapes and skin tears caused by wheelchair leg rest brackets, such ready deployment and reducing of risk being done in a safe, convenient, and economical manner, such calf bumper system comprising, in combination:

A wheelchair shown in FIG. 3 having leg rest brackets normally adapted to cause scrapes and skin tears to a user if the leg rest brackets are not properly covered. The leg rest bracket is formed with a flat section having a generally oval shape and a perpendicular post for engaging a leg rest.

A bumper fabricated of a first section 18 and a second section 20, the first section and the second section being coupled together to form a unitary device. The unitary device has a geometric configuration with an upper surface 22 and a lower surface 24 separated by a height of 0.5 inches, plus or minus 10 percent. The upper surface and lower surface have rounded edges.

The unitary device has a forward linear side 26 and a parallel rearward linear side 28 separated by a width of 2 inches, plus or minus 10 percent. The unitary device has a first end 30 and an opposed second end 32, each end being semi-circular with a diameter of two inches, plus or minus 10 percent. The unitary device has a unitary aperture 34 extending from the upper surface to the lower surface. The unitary aperture includes a small extent 36 in the first section and a large extent 38 in the second section. The small extent is generally semi-circular with a generally rectangular extension. The large extent is generally semi-circular. The small extent and the large extend form a keyhole shape. The circular portion of the keyhole has beveled interior edges 40. The small extent and the large extent form a keyhole shape. The rectangular extension of the small extent is adapted to receive the perpendicular post on the leg rest bracket. The unitary device is fabricated of a semi-rigid pliable material taken from a class of semi-rigid materials including plastic, polymer and rubber.

A first chamber 42 is formed in the first section, a second chamber 44 is formed in the second section. The first chamber and the second chamber form a unitary chamber with a configuration congruent with the geometric configuration of the unitary device. The unitary chamber is adapted to receive the flat section of the leg rest bracket. The unitary device has a wall thickness of 0.1875 inches, plus or minus 10 percent, over the majority of its extent.

A U-shaped recess 48 is formed in the first section extending from the interior of the upper surface along the interior of the rearward linear side, to the interior of the lower surface adjacent to the rearward linear side, and facing the second section. A U-shaped projection 52 is formed in the second section adjacent to the rearward linear side and extending into a space formed by the U-shaped recess.

A chemical weld is located between the U shaped recess and the U-shaped projection coupling the first section and the second section.

An opening 58 is located between the unitary aperture and the forward linear side to allow opening of the unitary device to expose the first chamber and the second chamber for facilitating putting the unitary device on the leg rest bracket and for facilitating removing the unitary device from the leg rest bracket, the opening being in a plane extending through a central extent of the U-shaped projection and the U-shaped recess.

The bumper is easily installed by twisting the device to open exposing the unitary aperture and unitary chamber and putting the device on the leg rest bracket of a wheel chair.

The calf bumper system provides an accessory that covers the metal bracket that holds a leg rest on a wheelchair. Often times the wheelchair leg rest is removed in order to allow a patient to propel the wheelchair using his/her feet. A patient propels the wheelchair using his/her feet by pulling the chair along as they take "steps", causing his/her legs to swing under the chair and back. When the leg rest is removed, the support bracket protrudes into the space underneath the wheelchair seat. Scrapes, cuts and skin tears result when the patient's leg comes into contact with the exposed brackets when propelling the wheelchair using his/her feet, as well as when getting into the chair. The "Calf Bumper" provides protective buffer surrounding the exposed bracket reducing the risk of injuries. Preventing skin injuries in older patients is particularly important. Older patients can have very thin skin, making the injury very easy to occur. Healing is slowed by age-related problems such as poor circulation, diabetes, and likelihood of taking blood thinners. The injury is referred to in nursing documentation as a "skin tear". Any time an "incident" occurs (such as a skin tear), the nurse must report and document the injury, notify the physician as well as the healthcare surrogate and/or power of attorney. An "intervention" must be put into place by the nurse to prevent another occurrence and the "incident" must also be documented.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A calf bumper system comprising:
   a bumper fabricated of a first section and a second section coupled together to form a unitary device, the unitary device having a geometric configuration with an upper surface and a lower surface separated by a height, a rearward side and a forward side separated by a width, and first semi-circular end and a second semi-circular end, the unitary device having a unitary aperture extending from the upper surface to the lower surface, the unitary aperture having a small extent in the first section, the unitary aperture having a large extent in the second section, the large extent being semi-circular, the small extent being semi-circular, the small extent having a rectangular extension, the rectangular extension having a semi-circular end, the small extent and the large extent forming a keyhole shape, the circular portion of the keyhole having a beveled interior edge, the unitary device being fabricated of an elastomer; and
   a first chamber in the first section, a second chamber in the second section, the first chamber and the second chamber forming a unitary chamber.

2. The system as set forth in claim 1 and further comprising an opening located between the unitary aperture and the forward side to facilitate opening the unitary device to use the system.

3. The system as set forth in claim 1 and further comprising a bond coupling the first section and the second section adjacent to the rearward side.

4. The system as set forth in claim 1 wherein the unitary chamber is adapted to receive a flat section of a leg rest bracket having an oval shape and a perpendicular post for engaging a leg rest.

5. The system as set forth in claim 1 and further including a recess formed in the first section parallel with the upper surface and the lower surface adjacent to the rearward side facing the second section, the recess forming a space there between; and
   a projection formed in the second section adjacent to the rearward side extending into the space formed by the recess.

6. The system as set forth in claim 1 wherein the unitary device is adapted to removably couple to a leg rest bracket on a wheel chair, the leg rest bracket normally adapted to cause scrapes and skin tears to a user if the leg rest bracket is not properly covered, the unitary device being removably coupled to the leg rest bracket.

7. A calf bumper system readily deployable for reducing the risk of scrapes and skin tears caused by wheelchair leg rest brackets, such ready deployment and reducing of risk being done in a safe, convenient, and economical manner, such calf bumper system comprising, in combination:
   A bumper adapted to cover a leg rest bracket on a wheel chair, the leg rest bracket normally adapted to cause scrapes and skin tears to a user if the leg rest bracket is not properly covered, the leg rest bracket formed with a flat section having an oval shape and a perpendicular post for engaging a leg rest;
   the bumper fabricated of a first section (18) and a second section (20), the first section and the second section being coupled together to form a unitary device, the unitary device having a geometric configuration with an upper surface (22) and a lower surface (24) separated by a height of 0.5 inches, plus or minus 10 percent, the unitary device having a forward linear side (26) and a parallel rearward linear side (28) separated by a width of 2 inches, plus or minus 10 percent, the unitary device having a first end (30) and an opposed second end (32), each end being semi-circular with a diameter of 2 inches, plus or minus 10 percent, the unitary device having a unitary aperture (34) extending from the upper surface to the lower surface, the unitary aperture including a small extent (36) in the first section, the unitary aperture including a large extent (38) in the second section, the large extent being semi-circular, the small extent being semi-circular, the small extend including a rectangular extension, the rectangular extension having a semi-circular end, the small extent and the large extent forming a keyhole shape, the circular portion of the keyhole having a beveled interior edge, the unitary device being fabricated of a semi-rigid pliable material taken from a class of semi-rigid materials including plastic, polymer and rubber;
   a first chamber (42) in the first section, a second chamber (44) in the second section, the first chamber and the second chamber forming a unitary chamber with a configuration congruent with the geometric configuration of the unitary device, the unitary chamber adapted to receive the flat section of the leg rest bracket, the unitary device having a wall thickness of 0.1875 inches, plus or minus 10 percent, over the majority of its extent;
   a U-shaped recess (48) formed in the first section parallel with the upper surface and the lower surface adjacent to the rearward linear side facing the second section;
   a U-shaped projection (52) formed in the second section adjacent to the rearward linear side extending into a space formed by the U-shaped recess;
   a chemical weld located between the U-shaped recess and the U-shaped projection coupling the first section and the second section; and
   an opening (58) located between the unitary aperture and the forward linear side to allow twisting the unitary device to expose the first chamber and the second chamber for facilitating putting the unitary device on the leg rest bracket and for facilitating removing the unitary device from the leg rest bracket, the opening being in a plane extending through a central extent of the U-shaped projection and the U-shaped recess.

* * * * *